United States Patent [19]

Wu

[11] Patent Number: 5,365,526
[45] Date of Patent: Nov. 15, 1994

[54] TRACE SYSTEM FOR AN I/O CHANNEL

[75] Inventor: Chun Wu, Alameda, Calif.

[73] Assignee: Amdahl Corporation, Sunnyvale, Calif.

[21] Appl. No.: 993,100

[22] Filed: Dec. 18, 1992

[51] Int. Cl.[5] .......................................... G06F 11/34
[52] U.S. Cl. .............................. 371/16.5; 364/265.5; 364/944.7
[58] Field of Search ........................... 371/16.5, 29.1; 395/575, 800, 275

[56] References Cited

U.S. PATENT DOCUMENTS

| | | | |
|---|---|---|---|
| 4,310,895 | 1/1982 | Edstrom | 371/34 |
| 5,185,862 | 2/1993 | Casper | 395/250 |
| 5,287,363 | 2/1994 | Wolf | 371/21.1 |

*Primary Examiner*—David Y. Eng
*Attorney, Agent, or Firm*—Fliesler, Dubb, Meyer & Lovejoy

[57] ABSTRACT

A trace system for selectively storing in tags stored in a TAG IN register and out tags stored in a TAG OUT register of an I/O channel controlled by an I/O channel controller, the trace system comprising a first means for generating a first signal whenever an in tag is changed in the TAG IN register, a second means for generating a second signal whenever out tags are written into the TAG OUT register, a storage means for storing the in tags and the out tags and a control means for storing, in response to a first or second signal, the in tags stored in the TAG IN register and the out tags stored in the TAG OUT register present when the first or second signal is generated. Means are further provided for allowing the storage means to be read by the I/O channel controller when an interface control check error is detected by the I/O channel in response to I/O channel interface malfunction. The trace system, upon the occurrence of an interface control check error, will store the tags presently stored in the TAG IN and TAG OUT registers and will mark those tags such that the system will be able to identify which tags were stored in the TAG IN and TAG OUT registers associated with the interface control check error.

10 Claims, 2 Drawing Sheets

TRACE SYSTEM FOR AN I/O CHANNEL

BACKGROUND OF THE INVENTION

1. Field of the Invention

The invention relates to a system for tracing the contents of the TAG IN and TAG OUT registers in an I/O channel.

2. Description of the Related Art

The concept of tracing the operation of an I/O channel to aid in diagnoses of problems encountered by the I/O channel has been done within the I/O channel art field. Generally, this has been accomplished by tracing the contents of the TAG IN register associated with the I/O channel for every cycle of operation of the I/O channel. The contents of the TAG IN register for each cycle would be sequentially stored in a dedicated RAM which could be accessed by the operating system. When an interface control check error is detected by the I/O channel, the I/O channel freezes the channel interface and enter into a diagnostic mode to ascertain what caused the interface control check error.

While the above employed methodology of tracing part of the operation of the I/O channel has been helpful in diagnosing I/O channel interface problems, the information obtained was not sufficient to allow the diagnosis of the many errors that occur within the I/O channel.

Further, since no history is maintained for the TAG OUT register, the only set of out tags available to the system for diagnosing the problem would be those out tags stored in the TAG OUT register when the I/O channel is frozen at the time that interface control check error has been detected by the I/O channel. It has been found that there may be a delay in generating the interface control check signal generated by the I/O channel upon the detection of an interface control check error such that the previous set of out tags, than those out tags presently stored in the TAG OUT register, may have been involved in the generation of the interface control check error.

SUMMARY OF THE INVENTION

It therefore is an object of the present invention to provide a means for tracing both the contents of the TAG IN and the TAG OUT registers of an I/O channel.

It is a further object of the invention to provide a means for selectively storing the contents of the TAG IN and TAG OUT registers whenever the contents of either the TAG IN or TAG OUT register has been changed.

It is another object of the invention to tag the stored contents of the TAG IN and TAG OUT registers to identify the contents of the TAG IN and TAG OUT registers when an interface control check error is detected.

Briefly, the invention comprises a TRACE TAG IN register and a TRACE TAG OUT register for storing the contents of the TAG IN and TAG OUT registers. Means are provided for transferring the contents of the TAG IN register to the TRACE TAG IN register and the TAG OUT register to the TRACE TAG OUT register whenever either the contents of the TAG IN register change or when an operation is undertaken to write new out tags into the TAG OUT register. The contents of the TAG IN and TAG OUT registers are stored together, as a pair, in a dedicated RAM. The TAG IN register is always stored at even addresses and the TAG OUT register is always stored at odd addresses. A state machine is provided to detect changes in the contents of the TAG OUT and TAG IN registers, to transfer the contents of the TAG IN register to the TRACE TAG IN register and the contents of the TAG OUT register to the TRACE TAG OUT register and to transfer the contents of the TAG IN and TAG OUT registers to the trace RAM when a change in contents is detected or an interface control check error is detected. The occurrence of an interface control check error is sensed by the I/O channel and the I/O channel controller. The state machine generates the trace RAM addresses for storing each pair of in tags and out tags and generates a signal enabling the reading out and the writing into of the trace RAM 45. A trace buffer is provided to provide temporary storage of in tags and out tags being read out of or written into the trace RAM. The I/O channel controller, controlling the operation of the I/O channel, can turn on and off the trace system to allow the I/O channel controller to read the contents of the trace RAM when the trace system is turned off. Means are provided for tagging the contents of the TAG OUT register whenever an interface control check error is detected by the I/O channel so as to provide a marker to the diagnostic programs as to which pair of in tags and out tags were associated with the interface control check error.

An advantage of the channel trace system is that the contents of the TAG IN and TAG OUT registers may be stored in the trace RAM, in real time, without degrading the performance of the overall system.

Another advantage of the channel trace system is to record the activities of the I/O channel to device interface so that the history of the I/O channel's operation can be analyzed.

Another advantage of the channel trace system is the marking of the in and out tags stored within the trace RAM associated with the occurrence of an interface control check error.

Finally, another advantage of the invention is that the system provides means for stopping the channel trace system to allow the I/O controller to read the trace RAM either in response to an interface control check error or during normal maintenance or bring-up operations.

BRIEF DESCRIPTION OF THE DRAWINGS

The invention will be described with respect to the particular embodiments thereof and references will be made to the drawings, in which.

DESCRIPTION OF THE PREFERRED EMBODIMENTS

Figure 1:
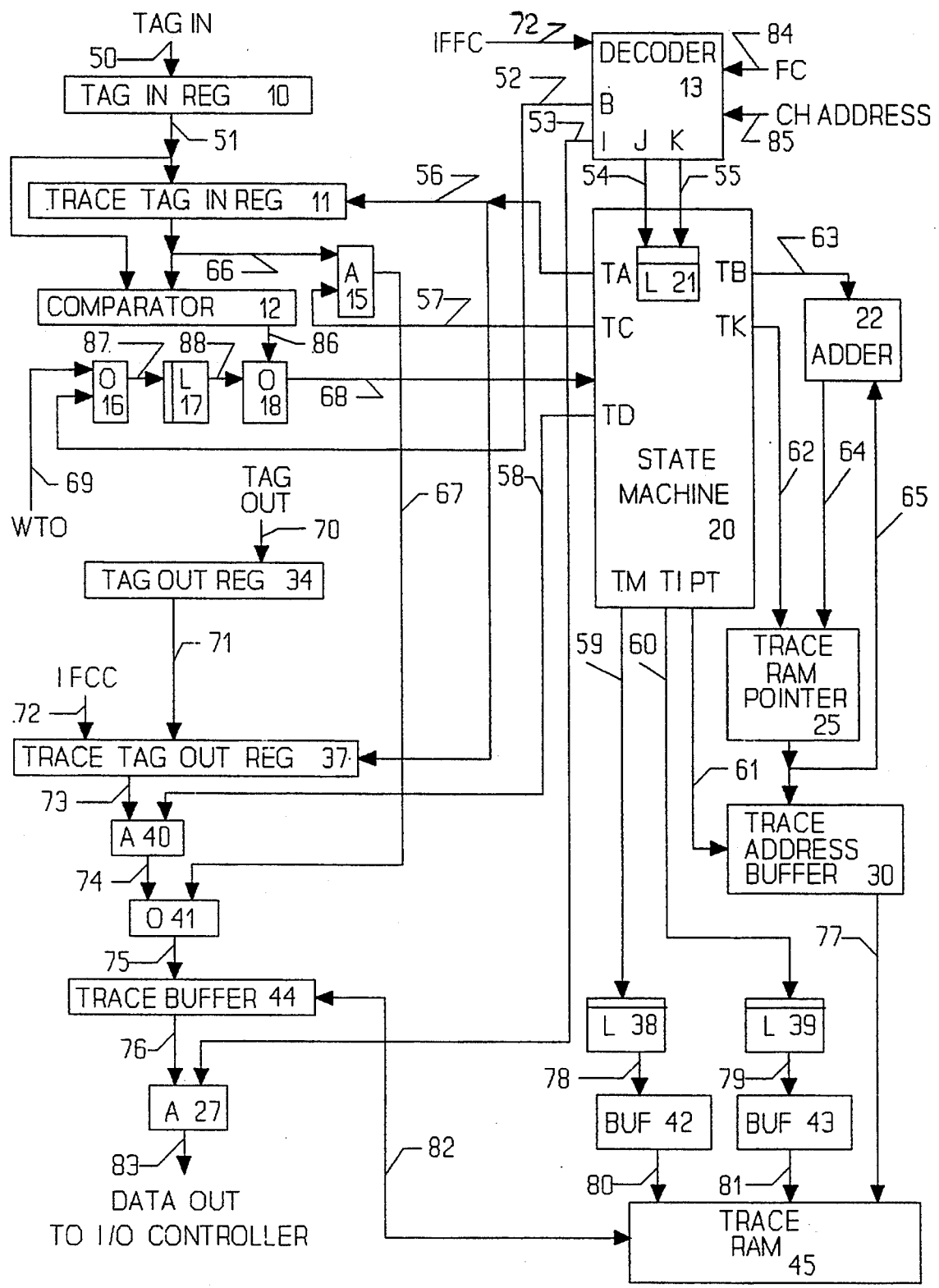
FIG. 1 is a logic diagram of the channel trace system necessary to implement the trace operation within the I/O channel.

FIG. 1 shows the logic necessary to implement the channel trace system in a channel for selectively tracing the in tags and out tags stored in the TAG IN and TAG OUT registers of the I/O channel. It should be noted that the logic associated with the normal operation of the I/O channel is not shown in FIG. 1 such that FIG.

1 shows only that logic necessary for implementing the invention herein.

The TAG IN register 10 receives the in tags on line 50. The in tags are OPERATIONAL IN, SELECT IN, REQUEST IN, ADDRESS IN, DATA IN, SERVICE IN, STATUS IN and DISCONNECT IN. The in tags are normally stored in the TAG IN register under the control of an I/O channel logic not shown. The TAG OUT register 34 stores the out tags received on line 70. The out tags are OPERATIONAL OUT, SELECT OUT, HOLD OUT, ADDRESS OUT, DATA OUT, SERVICE OUT, COMMAND OUT and SUPPRESS OUT. Normally, the generation and storing of the out tags are a function of I/O channel logic not shown.

The I/O channel decoder 13 receives function codes FC on line 84 and an I/O channel address on line 85 from the I/O channel controller. Decoder 13 decodes the function codes FC on line 84 and generates signals necessary for carrying out the decoded function code. The I/O channel address on line 85 identifies the I/O channel to receive the function code on line 84. Decoder 13, in response to functional codes received on line 84, generates a write TAG OUT register signal B on line 52, a read trace RAM signal I on line 53, a stop trace signal J on line 54 and a resume trace signal K on line 55.

The channel trace system employs a state machine 20 to control the sequence of operation and to generate the necessary control signals for carrying out the trace function of the channel trace system. State machine 20 contains stop trace latch 21 which is controlled by decoder's 13 stop trace signal J on line 54 and resume trace signal K on line 55. When latch 21 is set by the stop trace signal J on line 54, the state machine will prepare the channel such that the I/O channel controller can read the trace RAM 45. When latch 21 has been reset by the resume trace signal K on line 55, state machine 20 will monitor the operation of the I/O channel and trace the contents of the TAG IN and TAG OUT registers. State machine 20 controls the moving of the contents of the TAG IN register 10 and the TAG OUT register 34 to trace RAM 45 when an in tag has been changed in TAG IN register 10 or when the system writes out tags into TAG OUT register 34 or when an interface control check error is detected by the I/O channel.

Comparator 12 compares the contents of the TAG IN register 10 appearing on line 51 with the contents of the TRACE TAG IN register 11 appearing on line 66. When the contents of the two registers are different, comparator 12 generates a signal on line 86 to OR 18. OR 16 is conditioned by either a write TAG OUT signal WTO on line 69 of the I/O channel or a write TAG OUT register signal B on line 52 from decoder 13 which was issued by the I/O channel controller. The output of OR 16 on line 87 sets latch 17. The set output of latch 17 on line 88 indicates that out tags have been written into the TAG OUT register 34. The conditioned output of OR 18 on line 68 to state machine 20 indicates that the criteria for tracing the contents of the TAG IN register 10 and the TAG OUT register 34 have been met. In response to the conditioned output of OR 18, state machine 20 generates a signal TA on line 56 to the TRACE TAG IN register 11 and the TRACE TAG OUT register 37. Signal TA will transfer the in tags stored in TAG IN register 10 into TRACE TAG IN register 11 and the out tags stored in TAG OUT register 34 into TRACE TAG OUT register 37. State machine 20 generates a signal TC on line 57 which conditions AND 15 such that the contents of the TRACE TAG IN register 11 are transferred through OR 41 on line 75 to trace buffer 44. The state machine 20 generates a signal TD on line 58 to AND 40 which transfers the contents of the TRACE TAG OUT register 37 via line 74 through OR 41 via line 75 to trace buffer 44. State machine 20 generates signal TM on line 59 to set the read enable latch 38 and TI on line 60 to set trace RAM write enable latch 39.

The state machine 20 increments the address for the trace RAM 45 by generating signal TB on line 63 to adder 22 which will add one to the address on line 65 from trace RAM pointer 25 and provide the incremented address on line 64. The state machine 20 next generates a signal TK on line 62 to trace RAM pointer 25 to write into trace RAM pointer 25 the new address appearing on line 64 from adder 22. Finally, a signal PT generated on line 61 by state machine 20 to trace address buffer 30 will transfer the address in trace RAM pointer 25 on line 65 to trace address buffer 30. Trace address buffer 30 provides the address on line 77 to the trace RAM 45 for selecting the address into which data is to be stored or read from the trace RAM 45. Trace buffer 44 is connected by line 82 to trace RAM for transferring data to and from the trace buffer 44 from the trace RAM 45.

The output of latch 38 is connected by line 78 to buffer 42. The output of latch 39 is connected by line 79 to buffer 43. The output of buffer 42 on line 80 is a signal to trace RAM 45 for transferring data from the address on line 77 from trace address buffer 30 to trace buffer 44. The output of buffer 43 on line 81 is a signal to trace RAM 45 for transferring the contents of the trace buffer 44 into the trace RAM 45 at the address appearing on line 77 from the trace address buffer 30. Decoder 13 generates a read trace RAM signal I on line 53 to condition AND 27 for transferring the contents of the trace buffer 44 on line 83 to the I/O channel controller for further processing.

TRACE TAG OUT register 37 stores one additional bit to the stored out tags. The I/O channel, by logic not shown, generates an interface control check signal IFCC when the I/O channel detects an interface control check error. The interface control check signal IFCC will set the extra bit in the TRACE TAG OUT register to identify the pair of in tags and out tags thereafter stored as being associated with the detection of an interface control check error. While all of the in tags and out tags may be stored, it has been found that the diagnostic information derived from the in tag DATA IN and the out tags DATA OUT, HOLD OUT and OPERATION OUT is not of great value and, therefore, these tags need not be traced. If the designer therefore chooses not to trace the aforementioned in tags and out tags, the TRACE TAG IN register 11 need only be 7 bits in length and the TRACE TAG OUT register 37 need only be 6 bits in length. It should be noted that the TRACE TAG OUT register 37 needs to be 6 bits because 5 bits are needed to trace the remaining out tags and 1 bit is needed to indicate the occurrence of an interface control check signal on line 72. The advantage in not tracing the mentioned in and out tags is that the contents of the two registers may be stored in one byte of information each, that is 8 bits plus a parity bit within the trace RAM 45.

Finally, the state machine will store in tags at even addresses and out tags at odd addresses in trace RAM 45. The trace RAM 45 has 512 addresses for storing 256 pairs of in tags and out tags. When the 512 locations are full, the address will wrap around thereby overwriting the oldest pair of in tags and out tags stored in trace RAM 45.

Figure 2:
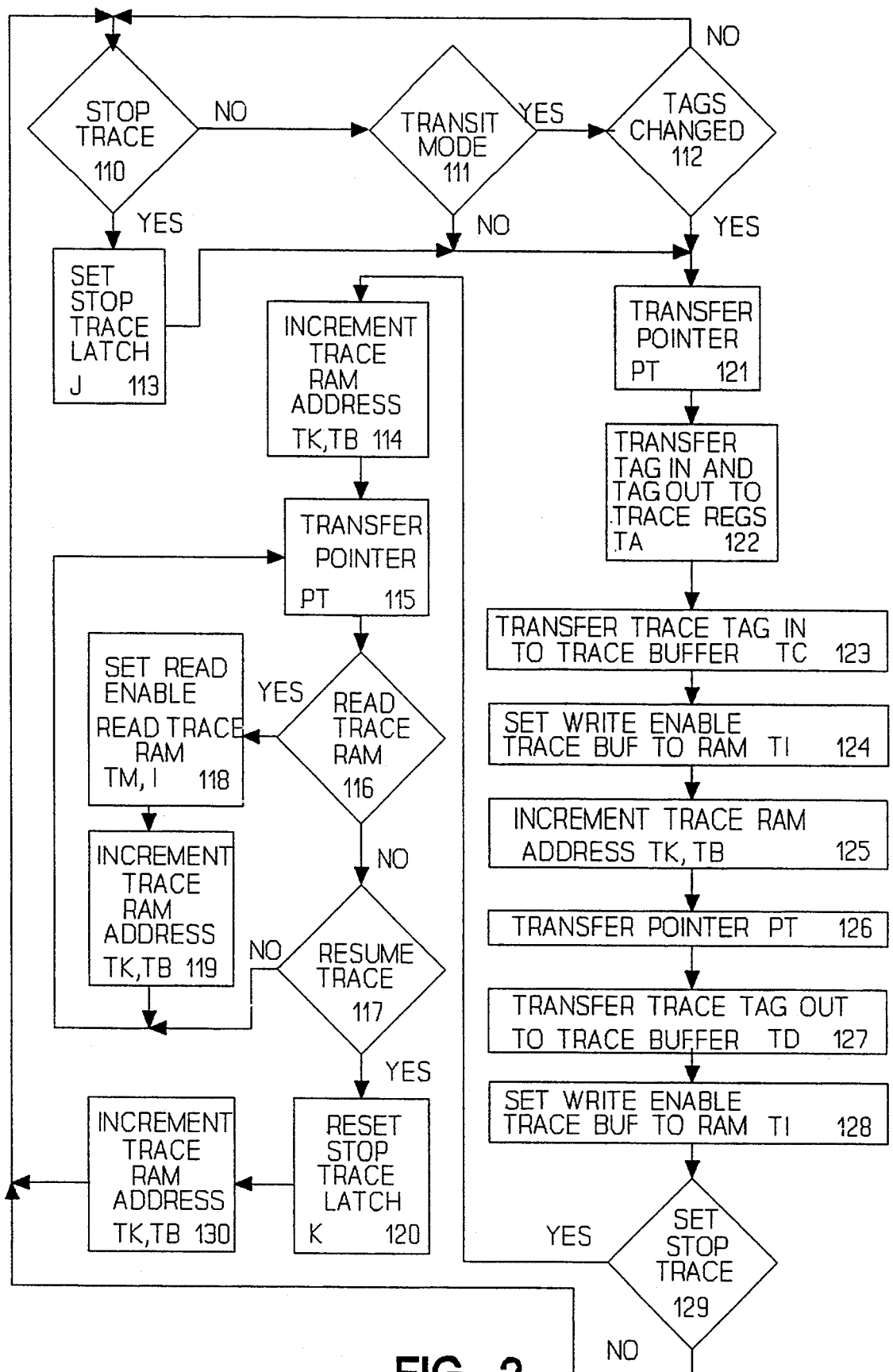
FIG. 2 is a flow diagram of the operation of the channel trace system for tracing the contents of the TAG IN and TAG OUT registers.

The operation of the channel trace system is shown in FIG. 2. State machine 20 at step 110 tests for the stop trace condition. If the condition is not met, then the state machine at step 111 will test if the channel is in a transit mode. If the system is not in a transit mode, then the system is in what is called a timing mode. A timing mode allows the tracing of the in tags and out tags for each cycle of operation regardless of whether the conditions of tracing in the transit mode have been met. This is provided to allow the channel to be exercised in a diagnostic mode and the results of each cycle of operation will be provided for use by the diagnostic programmer. If the condition of step 111 is not met then the state machine goes to step 121.

If the condition of step 111 is met, then the state machine 20 at step 112 tests for a change in the tags by testing for a conditioned output from OR 18, indicating that an in tag has been changed or out tags have been written into TAG OUT register 34. If the conditions of step 112 are met then the state machine goes to step 121. If the conditions of step 112 are not met then the state machine returns to step 110.

Step 121 through 128 will store one pair of in tags and out tags (including the interface control check bit) in the trace RAM 45. At step 121 the state machine will transfer the address in trace RAM pointer 25 to trace address buffer 30 by generating signal PT. At step 122 the state machine will transfer the contents of the TAG IN and TAG OUT registers into the TRACE TAG IN and the TRACE TAG OUT registers by generating signal TA. At step 123 the state machine will transfer the contents of the TRACE TAG IN register 37 to the trace buffer 44 by generating signal TC. At step 124 the state machine will set write enable trace latch 39 by signal TI resulting in the contents of the trace buffer 44 being stored in trace RAM 45 at the address indicated in trace address buffer 30. At step 125 the state machine will increment the address in trace RAM pointer 25 by adding one to the present address stored in trace RAM pointer 25 and storing the incremented address back into trace RAM pointer 25 by signals TB and TK. At step 126 the state machine transfers the new address stored in trace RAM pointer 25 to the trace address buffer 30 by signal PT. At step 127 the state machine will transfer the contents of the TRACE TAG OUT register 37 to trace buffer 44 by signal TD. At step 128 the state machine will set the write trace RAM latch 39 by signal TI resulting in the out tags and the interface control check bit stored in trace buffer 44 to be stored in trace RAM 45 at the address stored in trace address buffer 30.

During this sequence of operations of steps 121 through 128, the state machine goes through two cycles of operation. At the end of each cycle of operation latches 17, 38 and 39 are reset. When step 128 is completed the condition of step 129 is tested to determine if the sequence was entered from step 111, 112 or 113. If the condition of step 129 is met, then the sequence was entered from step 113 and the state machine will go to step 114. If the condition of step 129 is not met, then the sequence was entered from step 111 or step 112 and the state machine will return to step 110.

Returning to step 110, if the condition of step 110 is met, then the stop trace latch 21 within state machine 20 will be set by the stop trace signal J from decoder 13. State machine 20 will sense that stop latch 21 has been set and will perform step 121 through 128 to store the in tags and out tags (including the interface control check bit) in trace RAM 45. Upon detection of an interface control check error, the I/O channel will set the interface control check bit in TRACE TAG OUT register 37 to a one before the contents of the TRACE TAG OUT register 37 are transferred to trace buffer 44 at step 127. The I/O channel will also report the occurrence of the interface control check error to the I/O channel controller. The interface control check bit marks when the trace system has stored the tags in response to an interface control check error. This information allows the diagnostic programmer to know that either that marked pair of tags or the immediately preceding pair of tags were involved in the conditions that gave rise to the interface control check error in the first instance.

Under these conditions the state machine will go to step 114 from step 129. At step 114 the state machine will increment the trace RAM address stored in trace RAM pointer 25 by signals TB and TK. At this time the address in the trace RAM pointer 25 is the address of the oldest pair of in tags and out tags stored in trace RAM 45. At step 115 the state machine will transfer the address within trace RAM pointer 25 to trace address buffer 30 by signal PT. At step 116 the state machine 20 tests if the I/O channel controller wants to read the trace RAM 45. If the condition of step 116 is met, the state machine at step 118 will set the read trace RAM latch 38 thereby transferring the contents of the trace RAM 45 at the address indicated in address buffer 30 to trace buffer 44, which will then be transferred to the I/O channel controller by signal I generated by decoder 13 in response to a function code received on line 84 from the I/O channel controller. At step 119 the state machine increments the trace RAM address in trace RAM pointer 25 by signals TK and TB. At the completion of step 119 the state machine will go to step 115 and transfer the new address from the trace RAM pointer 25 to the trace address buffer 30. The system will loop between steps 115, 116, 118 and 119 as long as the I/O controller continues to desire to read the contents of the trace RAM 45. If for some reason the I/O channel controller is interrupted in reading trace RAM 45, the reading of trace RAM 45 may be suspended at step 117 and the state machine will loop on step 115, 116 and 117. When the I/O channel controller desires to return to reading trace RAM 45, the state machine is directed to go from step 116 to step 118. It should be noted that the address in the trace RAM pointer 25 has not been changed since the read operation has been suspended and the state machine looped on steps 115, 116 and 117. When the I/O channel controller has read all of the 256 pairs of in tags and out tags stored in trace RAM 45 and wants to resume the trace operation, the I/O channel controller, at step 120, will reset the stop trace latch 21 in state machine 20 by issuing a resume trace signal K. The state machine will then proceed to step 130 and increments the address in the trace RAM pointer 25 by signals TK and TB. This will place the address in trace RAM pointer 25 to the next address after the storage of tags resulting from the setting of the stop trace latch 21. State machine 20 will then proceed to step 110.

State machine 20 allows for the storing of tags into the trace RAM without interfering with the normal processing of the I/O channel. The trace system allows the I/O channel controller the choice to have the I/O channel resume operation and to resume the trace function whether or not it has ascertained the cause of the interface control check error that gave rise to the reading of the tags in the first instance.

While the invention has been particularly shown and described with references to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following.

What is claimed is:

1. A trace system in an I/O channel for generating and preserving the history of operation of said I/O channel which operates under the control of an I/O channel controller, said I/O channel having a TAG IN register for storing in tags and a TAG OUT register for storing out tags, said trace system comprising:
   first means for generating a first signal whenever the contents of said TAG IN register is changed in said TAG IN register during the operation of said I/O channel;
   second means for generating a second signal whenever said TAG OUT register is written into during the operation of said I/O channel;
   storage means for sequentially storing the contents of said TAG IN register and said TAG OUT register said in tags and said out tags; and
   control means for transferring to said storage means the contents of said TAG IN register and TAG OUT register whenever said first signal or said second signal is generated whereby the recent past history of the operation of said I/O channel is sequentially stored in said storage means for analysis upon detection of an error in the operation of said I/O channel by said I/O channel controller.

2. The trace system of claim 1 wherein said first means further comprises:
   a TRACE TAG IN register for storing the contents of said TAG IN register that was last transferred by said control means for storage in said storage means; and
   comparison means for generating said first signal when the contents of said TAG IN register is not equal to the contents of said TRACE TAG IN register.

3. The trace system of claim 2 further comprising:
   a TRACE TAG OUT register for storing the contents of said TAG OUT register that was last transferred by said control means for storage in said storage means; and
   said control means in response to receiving either said first signal or said second signal generating a first control signal for transferring the contents of said TAG IN register to said TRACE TAG IN register and a second control signal for transferring the contents of said TAG OUT register to said TRACE TAG OUT register.

4. The trace system of claim 3 further comprising:
   a buffer register; and
   said control means generating a third control signal to transfer the contents of said TRACE TAG IN register to said buffer register and a fourth control signal for transferring the contents of in said TRACE TAG OUT register to said buffer register.

5. The trace system of claim 4 further comprising:
   address means for generating the address in said storage means for storing the contents of said buffer register or from retrieving contents of said buffer register previously stored in said storage means; and
   said control means generating address signals to control the address generated by said address means.

6. The trace system of claim 5 wherein said control means generates a write signal for transferring the contents of said buffer register to said storage means at the address generated by said address means and a read signal for transferring the contents of said buffer register that was previously stored in said storage means at said address generated by said address means to said buffer register.

7. The trace system of claim 6 wherein said control means further comprises:
   sequence means for determining the sequence of generation of said first control signal, said second control signal, said third control signal, said fourth control signal, said address signals and said write signal for storing in said storage means the contents of said TAG IN register and said said TAG OUT register when either said first signal is generated by said first means or said second signal is generated by said second means.

8. The trace system of claim 7 wherein said sequence means determines the sequence of generating said address signals and said read signal for transferring to said buffer means from said storage means the contents of said buffer register that was previously stored at the address generated by said address means such that the contents of the buffer registers stored in said storage means which comprises the current past history of the contents of the TAG IN register and said TAG OUT register may be transferred to and read by said I/O channel controller.

9. The trace system of claim 8 wherein said control means generates said address signals which causes said address means to stored the contents of said buffer register at consecutive addresses in said storage means such that the contents of said TAG IN register is stored in even addresses in said storage means and the contents of said TAG OUT register is stored thereby forming an address pair containing the contents of said TAG IN register and said TAG OUT register whenever either said first or second signal was generated so as to store in said storage means in consecutive said address pairs the history of the operation of said I/O channel in odd addresses in said storage means.

10. The trace system of claim 8 further comprising:
    stop trace means in said control means for generating a stop signal in response to an interface control check error;
    said TRACE TAG OUT register including a marker stage to store a marker bit in addition to said out tags;
    set means for setting said marker bit in said TRACE TAG OUT register when said interface control check signal is generated; and
    said control means in response to said stop signal transferring, after said marker bit in said marker stage has been set in said TRACE TAG OUT register, the contents of said TAG IN register and said TAG OUT register to said storage means in the same manner as if a said first signal or a said second signal had been received by said control means and then said control means generating said address signals to said address means and said read signal to allow the contents of said storage means to be transferred to and read by said I/O channel controller whereby the I/O channel controller identifies the contents of said TAG OUT REGISTER that existed when said interface control check signal was generated by said marker bit thereby providing a time reference for all contents of said TAG IN register and said TAG OUT register stored in said storage means and identifying said the content of said even address of said storage means as being the contents of said TAG IN register and the contents of said odd addresses of said storage means as being the contents of said TAG OUT register.

* * * * *

UNITED STATES PATENT AND TRADEMARK OFFICE
CERTIFICATE OF CORRECTION

PATENT NO. : 5,365,526
DATED : November 15, 1994
INVENTOR(S) : Chun Wu

It is certified that error appears in the above-indentified patent and that said Letters Patent is hereby corrected as shown below:

Column 8, line 26, after "said" delete --said--;
Column 8, line 43, "stored" should be --store--.

Signed and Sealed this

Seventh Day of May, 1996

Attest:

BRUCE LEHMAN

Attesting Officer

Commissioner of Patents and Trademarks